US012624133B2

(12) United States Patent
Hosaka

(10) Patent No.: US 12,624,133 B2
(45) Date of Patent: May 12, 2026

(54) SOLID CATALYST COMPONENT FOR POLYMERIZATION OF OLEFIN AND METHOD FOR PRODUCING THE SAME, CATALYST FOR POLYMERIZATION OF OLEFIN AND METHOD FOR PRODUCING THE SAME, AND METHOD FOR PRODUCING POLYMER OF OLEFIN

(71) Applicant: TOHO TITANIUM CO., LTD., Chigasaki (JP)

(72) Inventor: Motoki Hosaka, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 689 days.

(21) Appl. No.: 17/921,663

(22) PCT Filed: Mar. 15, 2021

(86) PCT No.: PCT/JP2021/010319

§ 371 (c)(1),
(2) Date: Oct. 27, 2022

(87) PCT Pub. No.: WO2021/220644

PCT Pub. Date: Nov. 4, 2021

(65) Prior Publication Data

US 2023/0159671 A1       May 25, 2023

(30) Foreign Application Priority Data

Apr. 28, 2020    (JP) ................................. 2020-079594

(51) Int. Cl.
| | |
|---|---|
| *C08F 4/76* | (2006.01) |
| *C08F 4/10* | (2006.01) |
| *C08F 4/629* | (2006.01) |
| *C08F 10/06* | (2006.01) |

(52) U.S. Cl.
CPC ................. *C08F 4/76* (2013.01); *C08F 4/10* (2013.01); *C08F 4/6293* (2013.01); *C08F 10/06* (2013.01)

(58) Field of Classification Search
None
See application file for complete search history.

(56) References Cited

U.S. PATENT DOCUMENTS

| | | | |
|---|---|---|---|
| 4,399,054 A | 8/1983 | Ferraris et al. | |
| 4,990,477 A * | 2/1991 | Kioka ..................... | C08F 10/00 526/125.4 |
| 2011/0207900 A1 | 8/2011 | Yi et al. | |
| 2015/0240001 A1 * | 8/2015 | Hosaka ................. | C08F 210/06 502/115 |
| 2016/0326277 A1 | 11/2016 | Sugano et al. | |
| 2019/0233569 A1 | 8/2019 | Umebayashi | |

FOREIGN PATENT DOCUMENTS

| | | | |
|---|---|---|---|
| CN | 1170003 A | 1/1998 | |
| CN | 104628900 A | 5/2015 | |
| CN | 104640885 A | 5/2015 | |
| EP | 2 902 418 A1 | 8/2015 | |
| JP | 57-63310 A | 4/1982 | |
| JP | 10-60041 A | 3/1998 | |
| JP | 10060041 A * | 3/1998 | .............. C08F 10/00 |
| JP | 2007146065 A * | 6/2007 | |
| JP | 2012-508278 A | 4/2012 | |
| JP | 2013-249445 A | 12/2013 | |
| JP | 2016-532738 A | 10/2016 | |
| WO | 2015/107708 A1 | 7/2015 | |
| WO | 2018/066535 A1 | 4/2018 | |
| WO | 2019/094216 A1 | 5/2019 | |
| WO | 2020/067081 A1 | 4/2020 | |

OTHER PUBLICATIONS

JP-10060041-A, 1998, Machine translation (Year: 1998).*
JP 2007-146065 A, machine translation, 2007 (Year: 2007).*
Office Action dated Mar. 28, 2024, issued in counterpart CN application No. 202180031337.7, with English translation. (12 pages).
Extended (Supplementary) European Search Report dated May 3, 2024, issued in counterpart EP application No. 21797889.9. (7 pages).
Office Action dated Apr. 9, 2024, issued in counterpart TW application No. 110111446. (7 pages).
International Search Report dated May 18, 2021, issued in counterpart International Application No. PCT/JP2021/010319 (3 pages).
Office Action dated Feb. 6, 2024, issued in counterpart JP Application No. 2020-079594, with English translation. (6 pages).
Office Action dated Aug. 26, 2023, issued in counterpart CN Application No. 202180031337.7, with English Translation. (17 pages).

* cited by examiner

*Primary Examiner* — Satya B Sastri
(74) *Attorney, Agent, or Firm* — WHDA, LLP

(57) ABSTRACT

The present invention provides a solid catalyst component for polymerization of an olefin, which appropriately suppresses a decrease in polymerization activity per unit time when having been supplied to the polymerization of the olefin, even without using a phthalic acid ester, and can easily prepare a polymer of an olefin, in which drying efficiency is improved, and a content ratio of a remaining volatile organic compound is greatly reduced in a short period of time. The solid catalyst component for polymerization of an olefin includes magnesium, titanium, halogen and a 1,3-diether compound, wherein a ratio of the 1,3-diether compound contained in the solid catalyst component for polymerization of an olefin is 2.50 to 15.00% by mass, and a specific surface area of the solid catalyst component for polymerization of an olefin is 250 $m^2/g$ or larger.

1 Claim, No Drawings

1

SOLID CATALYST COMPONENT FOR POLYMERIZATION OF OLEFIN AND METHOD FOR PRODUCING THE SAME, CATALYST FOR POLYMERIZATION OF OLEFIN AND METHOD FOR PRODUCING THE SAME, AND METHOD FOR PRODUCING POLYMER OF OLEFIN

TECHNICAL FIELD

The present invention relates to a solid catalyst component for polymerization of an olefin and a method for producing the same; a catalyst for polymerization of an olefin and a method for producing the same; and a method for producing a polymer of an olefin.

BACKGROUND ART

In recent years, polyolefins such as polypropylene (PP) have been used in various applications such as containers and films, in addition to molded products such as automobile parts and household electric appliances.

Conventionally, as a method for polymerizing olefins, there have been proposed many methods for polymerizing olefins, which are methods of polymerizing propylene alone or with another α-olefin with the use of a solid catalyst component which contains magnesium, titanium, halogen and an internal electron-donating compound as essential components, or a catalyst for polymerization of an olefin, which contains an organoaluminum compound and an external electron-donating compound (for example, see Patent Literature 1 to Patent Literature 3).

CITATION LIST

Patent Literature

[Patent Literature 1] Japanese Patent Laid-Open No. 57-63310
[Patent Literature 2] U.S. Pat. No. 4,399,054
[Patent Literature 3] National Publication of International Patent Application No. 2016-532738

SUMMARY OF INVENTION

Technical Problem

As described in Patent Literature 1, the catalyst for polymerization of an olefin with the use of a phthalic acid ester as an electron-donating compound has conventionally been widely used. However, di-n-butyl phthalate and benzyl butyl phthalate, which are one type of phthalic acid esters, are identified as Substance of Very High Concern (SVHC) in European regulation concerning the Registration, Evaluation, Authorization and Restriction of Chemicals (REACH). Then, from the viewpoint of environmental load reduction, there is an increasing demand for conversion to a catalyst system that does not use an SVHC substance.

Meanwhile, known catalyst systems that uses an electron-donating compound which is not subject to SVHC regulation include a catalyst system that uses a succinic acid ester, a maleic acid ester, a malonic acid ester or the like, and catalyst systems described in Cited Literature 2 and Cited Literature 3. However, even in these catalyst systems, it has been difficult to exhibit the same performance as in the case of using the phthalic acid ester. In particular, in a polymerization facility in which there is a process in which a solid catalyst component, an organoaluminum compound, and an external electron-donating compound are contacted with each other in an inert gas atmosphere such as a nitrogen atmosphere, when an electron-donating compound is used which is not a substance subject to SVHC regulation, there is a tendency that the polymerization activity is remarkably lowered. Under such circumstances, further improvement has been required for a catalyst for polymerization of an olefin, to which an electron-donating compound is applied that is not subject to the SVHC regulation.

In addition, when such a conventional catalyst for polymerization is used, there is a case where an unreacted monomer or oligomer, or an organic solvent remains which has been used at the time of polymerization, as a volatile organic compound, in an obtained polymer of the olefins. Because of this, the volatile organic compound is degassed in a reaction device after the polymerization reaction, and then the polymer of the olefin is transferred to a post-step. However, even in the case of a polymer of an olefin, in which an amount of remaining gas is small, when it takes time to degas the polymer, there is a concern that a pressure in a system increases in the post-step or a mixing ratio of impurities into a recycle system increases, and thereby it becomes easy to cause a process trouble or deterioration in a quality of an obtained polymer. For this reason, it has been desired not only that the amount of the volatile organic compound remaining in the polymer is small, but also that the volatile organic compound remaining in the polymer is desorbed in a short period of time, but the catalyst for polymerization has not necessarily been proposed, which can greatly reduce a content ratio of the volatile organic compound in the polymer in a short period of time.

Under such circumstances, an object of the present invention is to provide a solid catalyst component for polymerization of an olefin, which appropriately suppresses a decrease in polymerization activity per unit time when having been supplied to the polymerization of the olefin, even without using a phthalic acid ester, and can easily prepare the polymer of an olefin, in which drying efficiency is improved, and a content ratio of a remaining volatile organic compound is greatly reduced in a short period of time, and a method for producing the same; a catalyst for polymerization of an olefin, and a method for producing the same; and a method for producing the polymers of the olefins.

Solution to Problem

In order to solve the above technical problem, the present inventors have intensively studied; as a result, found that the above technical problem can be solved by a solid catalyst component for polymerization of an olefin, which contains magnesium, titanium and halogen, also contains 2.50 to 15.00% by mass of a 1,3-diether compound, and has a specific surface area of 250 m²/g or larger; and completed the present invention on the basis of this finding.

Specifically, the present invention provides:
(1) a solid catalyst component for polymerization of an olefin, comprising magnesium, titanium, halogen and a 1,3-diether compound, wherein
a ratio of the 1,3-diether compound contained in the solid catalyst component for polymerization of an olefin is 2.50 to 15.00% by mass, and
a specific surface area of the solid catalyst component for polymerization of an olefin is 250 m=/g or larger;

(2) the solid catalyst component for polymerization of an olefin according to (1), wherein a pore volume is 0.250 to 1.000 cm$^3$/g;

(3) the solid catalyst component for polymerization of an olefin according to any one of (1) and (2), wherein the 1,3-diether compound is one or more selected from the compounds represented by the following general formula (I):

$$R^1OCH_2CR^2R^3CH_2OR^4 \qquad (I)$$

wherein R$^2$ and R$^3$ each represent a hydrogen atom, a halogen atom, an alkyl group having 1 to 12 carbon atoms, a vinyl group, an alkenyl group having 3 to 12 carbon atoms, a cycloalkyl group or cycloalkenyl group having 3 to 12 carbon atoms, an aromatic hydrocarbon group or halogen-substituted aromatic hydrocarbon group having 6 to 12 carbon atoms, an aromatic hydrocarbon group having 7 to 12 carbon atoms having a substituent, an alkylamino group having 1 to 12 carbon atoms, or a dialkylamino group having 2 to 12 carbon atoms; R$^2$ and R$^3$ are optionally the same as or different from each other; R$^2$ and R$^3$ are optionally linked to each other to form a ring; R$^1$ and R$^4$ each represent an alkyl group having 1 to 12 carbon atoms, a vinyl group, an alkenyl group having 3 to 12 carbon atoms, a cycloalkyl group having 3 to 6 carbon atoms, an aromatic hydrocarbon group or halogen-substituted aromatic hydrocarbon group having 6 to 12 carbon atoms, or an aromatic hydrocarbon group having 7 to 12 carbon atoms having a substituent; and R$^1$ and R$^4$ are optionally the same as or different from each other;

(4) a method for producing the solid catalyst component for polymerization of an olefin according to any one of (1) to (3), comprising contacting a magnesium compound having a specific surface area of 5 m$^2$/g or larger, a tetravalent titanium halogen compound, and a 1,3-diether compound with each other;

(5) a catalyst for polymerization of an olefin, comprising: the solid catalyst component for polymerization of an olefin according to any one of (1) to (3); and one or more organoaluminum compounds selected from compounds represented by the following general formula (II):

$$R^5{}_pAlQ_{3-p} \qquad (II)$$

wherein R$^5$ is an alkyl group having 1 to 6 carbon atoms, Q is a hydrogen atom or a halogen atom, and p is a real number of 0<p≤3;

(6) a method for producing a catalyst for polymerization of an olefin, comprising contacting the solid catalyst component for polymerization of an olefin according to any one of (1) to (3), or the solid catalyst component for polymerization of an olefin obtained by the method for producing the solid catalyst component for polymerization of an olefin according to (4), and one or more organoaluminum compounds with each other, which are selected from compounds represented by the following general formula (II):

$$R^5{}_pAlQ_{3-p} \qquad (II)$$

wherein R$^5$ represents an alkyl group having 1 to 6 carbon atoms, Q represents a hydrogen atom or a halogen atom, and p represents a real number of 0<p≤3;

(7) a method for producing a polymer of an olefin, comprising polymerizing an olefin using the catalyst for polymerization of an olefin according to (5), or the catalyst for polymerization of an olefin obtained by the method according to (6); and (8) the method for producing a polymer of an olefin according to (7), wherein the polymerization of the olefin is homopolymerization of propylene, or copolymerization of propylene and an α-olefin other than propylene.

Advantageous Effects of Invention

The present invention can provide: a solid catalyst component for polymerization of an olefin, which appropriately suppresses a decrease in polymerization activity per unit time when having been supplied to the polymerization of the olefin, because of containing a predetermined amount of a 1,3-diether compound in place of a phthalic acid ester and having a specific surface area controlled to a predetermined range, and can easily prepare the polymer of an olefin, in which drying efficiency is improved, and a content ratio of a remaining volatile organic compound is greatly reduced in a short period of time; and a method for producing the same. In addition, the present invention can provide: a catalyst for polymerization of an olefin including the above solid catalyst component, and a method for producing the same; and a method for producing a polymer of an olefin.

In other words, the present invention can provide: a solid catalyst component for polymerization of an olefin, which appropriately suppresses a decrease in the polymerization activity per unit time when having been supplied to a polymerization reaction of the olefin, and can easily prepare the polymer of an olefin, which can not only reduce a risk of an increase in pressure in a system and a mixing ratio of impurities in a recycle system in a post-step to reduce a process trouble and a degradation in quality of the obtained polymer because the gas is easily removed in a short period of time after the reaction, but also can have the improved drying efficiency, and the remaining volatile organic compound component greatly reduced in a short period of time; and a method for producing the same. In addition, the present invention can provide: a catalyst for polymerization of an olefin including the solid catalyst component, and a method for producing the same; and a method for producing a polymer of an olefin.

DESCRIPTION OF EMBODIMENTS

<Solid Catalyst Component for Polymerization of Olefin and Method for Producing the Same>

Firstly, a solid catalyst component for polymerization of an olefin according to the present invention will be described.

The solid catalyst component for polymerization of an olefin according to the present invention is a solid catalyst component for polymerization of an olefin, which includes magnesium, titanium, halogen and a 1,3-diether compound, wherein a ratio of the 1,3-diether compound contained in the solid catalyst component for polymerization of an olefin is 2.50 to 15.00% by mass, and a specific surface area of the solid catalyst component for polymerization of an olefin is 250 m$^2$/g or larger.

The solid catalyst component for polymerization of an olefin of the present invention includes a solid catalyst component that contains magnesium, titanium, halogen and a specific amount of a specific internal electron-donating compound.

Examples of the solid catalyst component for polymerization of an olefin according to the present invention include a contact reaction product that is formed by contacting a raw material component being a source of supplying magnesium, titanium and halogen, and a specific internal electron-donating compound with each other in an organic solvent, and reacting the compounds; and specifically include a contact reaction product that is formed by contacting raw materials which are a magnesium compound and tetravalent titanium halogen compound that are used as raw material components being a source of supplying magnesium, titanium and halogen, and a specific internal electron-donating compound containing one or more 1,3-diether compounds with each other.

Examples of the magnesium compound can include one or more compounds selected from dialkoxy magnesium, magnesium dihalide and alkoxy magnesium halide.

Among the above compounds, dialkoxy magnesium or magnesium dihalide is preferred. Specific examples thereof include dimethoxy magnesium, diethoxy magnesium, dipropoxy magnesium, dibutoxy magnesium, ethoxymethoxy magnesium, ethoxypropoxy magnesium, butoxyethoxy magnesium, magnesium dichloride, magnesium dibromide, and magnesium diiodide. Diethoxy magnesium or magnesium dichloride is particularly preferred.

Among the above magnesium compounds, dialkoxy magnesium may be obtained by reacting metal magnesium with an alcohol in the presence of halogen, a halogen-containing metal compound or the like.

The dialkoxy magnesium is preferably in a granule form or a powder form, and its shape that may be used is indefinite or spherical.

In the case of using spherical dialkoxy magnesium, a polymer powder having a more favorable particle shape and having a (more spherical) narrow particle size distribution is obtained. The handleability of the polymer powder is improved which has been formed at the time of polymerization operation, and the occlusion and the like can be prevented which originate in a fine powder contained in the formed polymer powder.

The spherical dialkoxy magnesium is not necessarily required to be truly spherical in shape, and dialkoxy magnesium having an oval shape or a potato shape may be used.

In addition, an average particle size (average particle size D50) of the dialkoxy magnesium is preferably 1.0 to 200.0 μm, and is more preferably 5.0 to 150.0 μm. Here, the average particle size D50 means a particle size of 50% at a cumulative particle size in a volume-cumulative particle size distribution at the time when measured with the use of a laser light scattering/diffraction particle size analyzer.

When the dialkoxy magnesium is spherical, the average particle size D50 is preferably 1.0 to 100.0 μm, more preferably 5.0 to 80.0 μm, and further preferably 10.0 to 70.0 μm.

In addition, for the particle size distribution of the dialkoxy magnesium, it is preferred that the dialkoxy magnesium should have a narrow particle size distribution with fewer numbers of a fine powder and a coarse powder.

Specifically, the dialkoxy magnesium preferably contains 20% or less, and more preferably 10% or less, of particles having a particle size of 5.0 μm or smaller, when measured with the use of a laser light scattering/diffraction particle size analyzer. On the other hand, the dialkoxy magnesium preferably contains 20% or less, more preferably 10% or less, of particles having a particle size of 100.0 μm or larger, when measured with the use of a laser light scattering/diffraction particle size analyzer.

Furthermore, when the particle size distribution thereof is represented by $\ln(D90/D10)$, the $\ln(D90/D10)$ is preferably 3 or smaller, and more preferably 2 or smaller. Here, D90 means a particle size of 90% at a cumulative particle size in a volume-cumulative particle size distribution, at the time when measured with the use of a laser light scattering/diffraction particle size analyzer. In addition, D10 means a particle size of 10% at a cumulative particle size in a volume-cumulative particle size distribution at the time when measured with the use of a laser light scattering/diffraction particle size analyzer.

A method for producing the spherical dialkoxy magnesium is illustrated in, for example, Japanese Patent Laid-Open No. 58-41832, Japanese Patent Laid-Open No. 62-51633, Japanese Patent Laid-Open No. 3-74341, Japanese Patent Laid-Open No. 4-368391, Japanese Patent Laid-Open No. 8-73388 and the like.

In the solid catalyst component for polymerization of an olefin according to the present invention, the magnesium compound which is a raw material component being a source of supplying magnesium has a specific surface area of preferably 5 m$^2$/g or larger, more preferably 5 to 50 m$^2$/g, and further preferably 10 to 40 m$^2$/g.

As will be described later, it becomes easy for a solid catalyst component having a desired specific surface area to be prepared, when containing a predetermined amount of a 1,3-diether compound and using a compound having a specific surface area within the above range as a magnesium compound.

Note that the specific surface area of the magnesium compound means a value measured by the BET method, in the present application document. For example, the specific surface area of the magnesium compound can be measured with the use of Automatic Surface Area Analyzer HM model-1230 manufactured by Mountech Co., Ltd., in the presence of a mixed gas of nitrogen and helium, according to the BET method (automatic measurement), after a measurement sample has been vacuum dried at 50° C. for 2 hours in advance.

The magnesium compound is preferably in a solution state or a suspension state during reaction. Such a solution state or a suspension state can allow the reaction to proceed preferably.

The magnesium compound, when being solid, can be prepared into a magnesium compound solution by dissolving the magnesium compound in a solvent having the capability of solubilizing the magnesium compound, or can be prepared into a magnesium compound suspension by suspending the magnesium compound in a solvent having no capability of solubilizing the magnesium compound.

The magnesium compound, when being liquid, may be used directly as a magnesium compound solution, or may be used as a magnesium compound solution by further dissolving the liquid magnesium compound in a solvent having the capability of solubilizing the magnesium compound.

Examples of the compound which can solubilize the solid magnesium compound include at least one compound selected from the group consisting of an alcohol, an ether and an ester. An alcohol such as ethanol, propanol, butanol, or 2-ethylhexanol is preferred, and 2-ethylhexanol is particularly preferred.

On the other hand, examples of a medium having no capability of solubilizing the solid magnesium compound include one or more solvents selected from saturated hydrocarbon solvents and unsaturated hydrocarbon solvents which do not dissolve the magnesium compound.

The tetravalent titanium halogen compound that is a raw material component being a source of supplying titanium and halogen in the solid catalyst component for polymerization of an olefin according to the present invention is not particularly limited, and is preferably one or more compounds selected from the titanium halide and alkoxy titanium halide groups represented by the following general formula (III):

$$Ti(OR^6)_rX_{4-r} \qquad (III)$$

wherein $R^6$ represents an alkyl group having 1 to 4 carbon atoms; X represents a halogen atom such as a chlorine atom, a bromine atom, or an iodine atom; and r is an integer of $0 \leq r \leq 3$.

Examples of the titanium halide represented by the general formula (III) include one or more titanium tetrahalides selected from titanium tetrachloride, titanium tetrabromide, titanium tetraiodide, and the like.

Examples of the alkoxy titanium halide represented by the general formula (III) include one or more compounds selected from methoxy titanium trichloride, ethoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, and tri-ethoxy titanium chloride, tripropoxy titanium chloride, tri-n-butoxy titanium chloride, and the like.

The tetravalent titanium halogen compound is preferably a titanium tetrahalide, and is more preferably titanium tetrachloride.

These titanium compounds may be used singly or in combination of two or more types thereof.

The solid catalyst component for polymerization of an olefin according to the present invention contains a 1,3-diether compound. The 1,3-diether compound is considered to act as a compound having an electron-donating group (internal electron-donating compound) in the solid catalyst component for polymerization of an olefin.

In the present application document, the 1,3-diether compound means a group of compounds that have a structure (1,3-dialkoxypropane structure) in which propane is used as a basic skeleton and an ether group is bonded to the 1,3-position thereof, and may further contain a desired substituent.

Examples of the 1,3-diether compound include one or more compounds selected from compounds represented by the following general formula (I);

$$R^1OCH_2CR^2R^3CH_2OR^4 \qquad (I)$$

wherein $R^2$ and $R^3$ each represent a hydrogen atom, a halogen atom, an alkyl group having 1 to 12 carbon atoms, a vinyl group, an alkenyl group having 3 to 12 carbon atoms, a cycloalkyl group or cycloalkenyl group having 3 to 12 carbon atoms, an aromatic hydrocarbon group or halogen-substituted aromatic hydrocarbon group having 6 to 12 carbon atoms, an aromatic hydrocarbon group having 7 to 12 carbon atoms having a substituent, an alkylamino group having 1 to 12 carbon atoms, or a dialkylamino group having 2 to 12 carbon atoms; $R^2$ and $R^3$ are optionally the same as or different from each other; $R^2$ and $R^3$ are optionally linked to each other to form a ring; $R^1$ and $R^4$ each represent an alkyl group having 1 to 12 carbon atoms, a vinyl group, an alkenyl group having 3 to 12 carbon atoms, a cycloalkyl group having 3 to 6 carbon atoms, an aromatic hydrocarbon group or halogen-substituted aromatic hydrocarbon group having 6 to 12 carbon atoms, or an aromatic hydrocarbon group having 7 to 12 carbon atoms having a substituent; and $R^1$ and $R^4$ are optionally the same as or different from each other.

Specific examples thereof include one or more compounds selected from 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)1,3-dimethoxypropane, and 9,9-bis(methoxymethyl) fluorene. Among them, one or more compounds selected from 2-isopropyl-2-isobutyl-1,3-dimethoxypropane, 2-isopropyl-2-isopentyl-1,3-dimethoxypropane and 9,9-bis(methoxymethyl) fluorene are preferred.

In the solid catalyst component for polymerization of an olefin according to the present invention, a content ratio of the 1,3-diether compound is 2.50 to 15.00% by mass, is preferably 4.50 to 15.00% by mass, and is more preferably 4.50 to 12.00% by mass.

In the solid catalyst component for polymerization of an olefin according to the present invention, the content ratio of the 1,3-diether compound is limited to the above range, and thereby the specific surface area of the solid catalyst component can be easily controlled to a desired range.

The solid catalyst component for polymerization of an olefin according to the present invention may include, as an internal electron-donating compound, a 1,3-diether compound and another internal electron-donating compound other than a phthalic acid ester (hereinafter referred to as "other internal electron-donating compound").

Thus, in the present application document, the internal electron-donating compound means any one of the case of a 1,3-diether compound alone and the case of a 1,3-diether compound and another internal electron-donating compound.

The other internal electron-donating compound is not particularly limited, but is preferably an organic compound other than the 1,3-diether compound, and an organic compound containing an oxygen atom or a nitrogen atom. Examples thereof can include one or more compounds selected from alcohols, phenols, ethers, esters, ketones, acid halides, aldehydes, amines, amides, nitriles, isocyanates, and organosilicon compounds containing an Si—O—C bond or an Si—N—C bond.

The other internal electron-donating compounds are more preferably one or more compounds selected from ether compounds such as monoethers, diethers and ether carbonates, and esters such as monocarboxylic acid esters and polycarboxylic acid esters; and are further preferably one or more compounds selected from aromatic polycarboxylic acid esters such as aromatic dicarboxylic acid diesters, aliphatic polycarboxylic acid esters, and alicyclic polycarboxylic acid esters, and diethers, and ether carbonates.

Other internal electron-donating compounds are particularly preferably one or more compounds selected from aliphatic polycarboxylic acid esters such as diethyl maleate, dibutyl maleate, dibutyl dimethylmaleate, dibutyl diethylmaleate, diethyl diisobutylmaleate, diethyl succinate, diethyl methylsuccinate, diethyl 2,3-diisopropylsuccinate, di-n-butyl malonate, diethyl malonate, dimethyl diisobutylmalonate, diethyl diisobutylmalonate, dimethyl benzylidenemalonate, diethyl benzylidenemalonate and dibutyl benzylidenemalonate; alicyclic polycarboxylic acid esters such as diethyl cyclohexanedicarboxylic acid, di-n-propyl cyclohexanedicarboxylic acid, dibutyl cyclohexanedicarboxylic acid, diisobutyl cyclohexanedicarboxylic acid, diethyl 1-cyclohexene-1,2-dicarboxylic acid, di-n-propyl 1-cyclohexene-1,2-dicarboxylic acid, dibutyl 1-cyclohexene-1,2-dicarboxylic acid, diisobutyl 1-cyclohexene-1,2-dicarboxylic acid, diethyl 4-cyclohexene-1,2-dicarboxylic acid, di-n-propyl 4-cyclohexene-1,2-dicarboxylic acid, dibutyl 4-cyclohexene-1,2-dicarboxylic acid and diisobutyl 4-cyclohexene-1,2-dicarboxylic acid; and ether carbonates such as (2-ethoxyethyl)ethyl carbonate and (2-ethoxyethyl)phenyl carbonate.

When the solid catalyst component for polymerization of an olefin according to the present invention contains the other internal electron-donating compound, a content ratio of the other internal electron-donating compound in the solid catalyst component for polymerization of an olefin according to the present invention may be 0.0 to 17.5% by mass.

When the solid catalyst component for polymerization of an olefin according to the present invention contains the other internal electron-donating compound, a total content ratio of the 1,3-diether compound and the other internal electron-donating compound contained in the solid catalyst component for polymerization of an olefin is preferably 2.50 to 20.00% by mass, is more preferably 4.50 to 20.00% by mass, and is further preferably 4.50 to 15.00% by mass.

The solid catalyst component for polymerization of an olefin having a large specific surface area can be easily prepared, also by having the total content ratio of the 1,3-diether compound and the other internal electron-donating compound, which is controlled in the above range.

In the present application document, each content of the 1,3-diether compound and the other internal electron-donating compound in the solid catalyst component for polymerization of an olefin means a value measured by a calibration curve prepared in advance by gas chromatography with the use of a standard solution. For example, each content of the 1,3-diether compound and the other internal electron-donating compound can be determined by use of a calibration curve which has been measured on the basis of a standard solution of a compound to be measured, when measured under the following conditions with the use of gas chromatography (GC-14B, manufactured by Shimadzu Corporation).

<Measurement Conditions>
Column: packed column ($\phi$2.6×2.1 m, Silicone SE-30 10%, Chromosorb WAWDMCS 80/100, manufactured by GL Sciences Inc.)
Detector: FID (Flame Ionization Detector, hydrogen flame ionization detector)
Carrier gas: helium, flow rate of 40 ml/min
Measurement temperature: vaporizing chamber: 280° C., column: 225° C., and detector: 280° C.; or vaporizing chamber: 265° C., column: 180° C., and detector: 265° C.

A content of a magnesium atom in the solid catalyst component for polymerization of an olefin according to the present invention is preferably 10.0 to 70.0% by mass, is more preferably 10.0 to 50.0% by mass, is further preferably 15.0 to 40.0% by mass, and is particularly preferably 15.0 to 25.0% by mass.

A content of a titanium atom in the solid catalyst component for polymerization of an olefin according to the present invention is preferably 0.5 to 8.0% by mass, is more preferably 0.5 to 5.0% by mass, and is further preferably 0.5 to 3.5% by mass.

A content of a halogen atom in the solid catalyst component for polymerization of an olefin according to the present invention is preferably 20.0 to 88.0% by mass, is more preferably 30.0 to 85.0% by mass, is further preferably 40.0 to 80.0% by mass, and is still further preferably 45.0 to 75.0% by mass.

In the present application document, the content of the magnesium atom in the solid catalyst component for polymerization of an olefin means a value measured by an EDTA titration method which involves dissolving the solid catalyst component in a hydrochloric acid solution and titrating the magnesium atom with an EDTA solution.

In the present application document, the content of the titanium atom in the solid catalyst component for polymerization of an olefin means a value measured in accordance with a method (redox titration) described in JIS 8311-1997 "Method for determination of titanium in titanium ores".

In the present application document, a content of a halogen atom in the solid catalyst component for polymerization of an olefin means a value measured by a silver nitrate titration method which involves treating the solid catalyst component with a mixed solution of sulfuric acid and pure water to prepare an aqueous solution, then sampling a predetermined amount, and titrating the halogen atom with a silver nitrate standard solution.

A specific surface area of the solid catalyst component for polymerization of an olefin according to the present invention is 250 m$^2$/g or larger, is preferably 250 to 600 m$^2$/g, is more preferably 250 to 500 m$^2$/g, and is further preferably 250 to 450 m$^2$/g.

The solid catalyst component for polymerization of an olefin according to the present invention has a large specific surface area as compared with conventional solid catalyst components for polymerization of olefins; appropriately suppresses a decrease in the polymerization activity per unit time, when having been supplied to the polymerization of the olefin; and can easily prepare the polymer of an olefin, in which a content ratio of a volatile organic compound is greatly reduced.

In the present application document, the specific surface area of the solid catalyst component for polymerization of an olefin means a value of a measurement sample which has been vacuum dried at 50° C. for 2 hours in advance, and then measured with the use of Automatic Surface Area Analyzer HM model-1230 manufactured by Mountech Co., Ltd., in the presence of a mixed gas of nitrogen and helium, according to the BET method (automatic measurement).

An average particle size (average particle size D50) of the solid catalyst component for polymerization of an olefin according to the present invention is not particularly limited, but is preferably 5.0 to 100.0 μm, is more preferably 10.0 to 80.0 μm, and is further preferably 15.0 to 70.0 μm.

Here, the average particle size D50 means a particle size of 50% at a cumulative particle size in a volume-cumulative particle size distribution, at the time when measured with the use of a laser light scattering/diffraction particle size analyzer.

The solid catalyst component for polymerization of an olefin according to the present invention has a large specific surface area as compared with conventional solid catalyst components, in spite of the fact that the average particle size D50 is within the above range.

In the solid catalyst component for polymerization of an olefin according to the present invention, a pore volume is preferably 0.250 to 1.000 cm$^3$/g, is more preferably 0.300 to 0.900 cm$^3$/g, and is more preferably 0.350 to 0.800 cm$^3$/g.

In the present application document, the pore volume of the solid catalyst component for polymerization of an olefin according to the present invention means a value measured (automatically measured) under the following conditions, with the use of BELSORP-miniII manufactured by MicrotracBEL, according to JIS Z 8831-2 (method of measuring mesopores and macropores by gas adsorption).

<Measurement Conditions>
   Sample amount: 0.15 g
   Average adsorption time: 300 seconds
   Adsorption temperature: 77 K
   Pretreatment condition: vacuum evacuation
   Measurement mode: high accuracy mode (simultaneous measurement of dead volume and saturated vapor pressure)
   Measurement range: pore diameter 1.1 to 355.0 nm (BJH Method)

The solid catalyst component for polymerization of an olefin according to the present invention has the pore volume within the above range, and thereby can easily provide a solid catalyst component having a high specific surface area.

The present invention can provide a solid catalyst component for polymerization of an olefin, which appropriately suppresses a decrease in polymerization activity per unit time, when having been supplied to the polymerization of the olefin, because of containing a predetermined amount of a 1,3-diether compound and having a specific surface area controlled to a predetermined range, and can easily prepare the polymer of an olefin, in which a content ratio of a volatile organic compound is greatly reduced.

In other words, the present invention can provide a solid catalyst component for polymerization of an olefin, which appropriately suppresses a decrease in the polymerization activity per unit time even without using a phthalic acid ester when having been supplied to the polymerization reaction of the olefin; and can easily prepare the polymer of an olefin, which can not only reduce a risk of an increase in pressure in a system and a mixing ratio of impurities in a recycle system in a post-step to reduce a process trouble and a degradation in quality of the obtained polymer, because the gas is easily removed in a short period of time after the reaction, but also can have the improved drying efficiency, and the remaining volatile organic compound component greatly reduced in a short period of time.

Next, a method for producing the solid catalyst component for polymerization of an olefin according to the present invention will be described.

The method for producing the solid catalyst component for polymerization of an olefin according to the present invention is a method for producing the solid catalyst component, and includes contacting a magnesium compound having a specific surface area of 5 mV/g or larger, a tetravalent titanium halogen compound and a 1,3-diether compound with each other.

Details of the above magnesium compound, tetravalent titanium halogen compound and 1,3-diether compound are as mentioned above. In addition, the amounts of the magnesium compound, the tetravalent titanium halogen compound and the 1,3-diether compound to be used are preferably appropriately blended so as to satisfy the respective contents of the magnesium compound, the tetravalent titanium halogen compound, and the 1,3-diether compound.

In the method for producing the solid catalyst component for polymerization of an olefin according to the present invention, the solid catalyst component for polymerization of an olefin according to the present invention may employ the aforementioned other internal electron-donating compound except the phthalic acid ester, together with the 1,3-diether compound.

Details of the 1,3-diether compound are as mentioned above. In addition, the amount of the other internal electron-donating compound to be used is also preferably appropriately blended so as to satisfy the content of the other internal electron-donating compound described above.

Contacting of the magnesium compound, the tetravalent titanium halogen compound and the internal electron-donating compound containing the 1,3-diether compound each other may be performed in the presence of a polysiloxane which is a third component.

The polysiloxane is a polymer having a siloxane bond (—Si—O— bond) in the backbone. The polysiloxane is also generally called silicone oil, and means chain, partially hydrogenated, cyclic or modified polysiloxane that is liquid or viscous at ordinary temperature, and has a viscosity of 0.02 to 100.00 cm$^2$/s (2 to 10000 cSt), and is more preferably 0.03 to 5.00 cm$^2$/s (3 to 500 cSt), at 25° C.

Examples of the chain polysiloxane include hexamethyldisiloxane, hexaethyldisiloxane, hexapropyldisiloxane, hexaphenyldisiloxane 1,3-divinyltetramethyldisiloxane, 1,3-dichlorotetramethyldisiloxane, 1,3-dibromotetramethyldisiloxane, chloromethylpentamethyldisiloxane, and 1,3-bis (chloromethyl)tetramethyldisiloxane, as disiloxane; and dimethylpolysiloxane and methylphenylpolysiloxane, as polysiloxane other than disiloxane. Examples of the partially hydrogenated polysiloxane include methyl hydrogen polysiloxane having a hydrogenation rate of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6, 8-tetramethylcyclotetrasiloxane. Examples of the modified polysiloxane include higher fatty acid group-substituted dimethylsiloxane, epoxy group-substituted dimethylsiloxane, and polyoxyalkylene group-substituted dimethylsiloxane. Among them, decamethylcyclopentasiloxane and dimethylpolysiloxane are preferred, and decamethylcyclopentasiloxane is particularly preferred.

It is preferred that the treatment (contact treatment) of contacting a raw material component being a source of supplying magnesium, titanium and halogen and an internal electron-donating compound containing the 1,3-diether compound with each other is performed in an organic solvent. In addition, the organic solvent is preferably an inert organic solvent.

The inert organic solvent is preferably liquid at ordinary temperature (20° C.) with a boiling point of 50 to 150° C., and is more preferably an aromatic hydrocarbon compound or a saturated hydrocarbon compound which is liquid at ordinary temperature and has a boiling point of 50 to 150° C.

Specific examples of the inert organic solvent include one or more compounds selected from: linear aliphatic hydrocarbon compounds such as hexane, heptane, and decane; branched aliphatic hydrocarbon compounds such as methylheptane; alicyclic hydrocarbon compounds such as cyclohexane, methylcyclohexane, and ethylcyclohexane; and aromatic hydrocarbon compounds such as toluene, xylene, and ethylbenzene.

Among the above inert organic solvents, an aromatic hydrocarbon compound that is liquid at ordinary temperature and has a boiling point of 50 to 150 C is preferred, because the aromatic hydrocarbon compound can improve the activity of the resulting solid catalyst component and improve the stereoregularity of the resulting polymer.

The raw material component being a source of supplying magnesium, titanium and halogen and an internal electron-donating compounds containing a 1,3-diether compound can be contacted with each other, by appropriate mixing with the use of an inert organic solvent.

The temperature at the time of the above reaction is preferably 0 to 130° C., is more preferably 40 to 130° C., is further preferably 30 to 120° C., and is still further preferably 80 to 120° C. In addition, the reaction time is preferably 1 minute or longer, is more preferably 10 minutes or longer, is further preferably 30 minutes to 6 hours, still further preferably 30 minutes to 5 hours, and is even further preferably 1 to 4 hours.

Prior to the reaction, low-temperature aging may be carried out. Here, the low-temperature aging means a preliminary reaction of contacting the respective components with each other at a temperature lower than the temperature at the time of the above reaction.

The temperature at the time of the low-temperature aging is preferably −20 to 70° C., is more preferably −10 to 60° C., and is further preferably −10 to 30° C. The low-temperature aging time is preferably 1 minute to 6 hours, is more preferably 5 minutes to 4 hours, and is further preferably 30 minutes to 3 hours.

When a magnesium compound and a tetravalent titanium halogen compound are used as raw material components being a source of supplying magnesium, titanium and halogen, and the compounds are contacted with internal electron-donating compounds containing a 1,3-diether compound with the use of an inert organic solvent, the amount of the tetravalent titanium halogen compound to be used with respect to 1 mol of the magnesium compound is preferably 0.5 to 100.0 mol, is more preferably 1.0 to 50.0 mol, and is further preferably 1.0 to 10.0 mol.

In addition, the amount of the internal electron-donating compound containing a 1,3-diether compound to be used with respect to 1 mol of the magnesium compound is preferably 0.03 to 0.3 mol, is more preferably 0.06 to 0.3 mol, and is further preferably 0.03 to 0.2 mol.

Furthermore, the amount of the inert organic solvent to be used is preferably 0.001 to 500 mol, is more preferably 0.5 to 100 mol, and is further preferably 1.0 to 20 mol, with respect to 1 mol of the magnesium compound.

In the contact treatment among the above components, the reaction is preferably performed with stirring in a container equipped with a stirrer, under conditions free of moisture and the like, in an inert gas atmosphere.

After the completion of the reaction in the contact treatment, the obtained reaction solution is left to stand, and the supernatant liquid is appropriately removed into a wet form (slurry form), and thereby a solid catalyst component can be obtained. Furthermore, the solid catalyst component can also be obtained by drying the wet reaction solution by hot air drying or the like.

The above reaction solution may be subjected to washing treatment, and the washing treatment is usually performed with the use of a washing liquid.

Examples of the washing liquid can include the same as the inert organic solvent described above, and one or more compounds are preferred which are selected from: linear aliphatic hydrocarbon compounds that are liquid at ordinary temperature and have a boiling point of 50 to 150° C., such as hexane, heptane, and decane; cyclic aliphatic hydrocarbon compounds that are liquid at ordinary temperature and have a boiling point of 50 to 150° C., such as methylcyclohexane and ethylcyclohexane; aromatic hydrocarbon compounds that are liquid at ordinary temperature and have a boiling point of 50 to 150° C., such as toluene, xylene, ethylbenzene, and o-dichlorobenzene; and the like.

The above washing liquid used easily dissolves and removes by-products and impurities from the reaction solution, and a reaction solution after washing can be obtained.

Furthermore, when the reaction solution after washing is dried by hot air drying or the like, a solid catalyst component can also be obtained.

The washing treatment is preferably performed at a temperature of 0 to 120° C., is more preferably at a temperature of 0 to 110° C., is further preferably at a temperature of 30 to 110° C., is still further preferably at a temperature of 50 to 110° C., and is even further preferably at a temperature of 50 to 100° C.

The washing treatment is preferably performed by adding a desired amount of washing liquid to the reaction solution, stirring the mixture, and then removing the liquid phase by a filtration method or a decantation method.

In addition, the number of washing times may be a plurality of times (two or more times).

After the components have been contacted with each other, impurities of unreacted raw material components or reaction by-products (alkoxy titanium halide, titanium tetrachloride-carboxylic acid complex, and the like) remaining in the reaction solution after washing can be removed by the washing treatment.

After the contact treatment or the washing treatment, aftertreatment may be appropriately carried out.

In the case of carrying out the above aftertreatment, examples thereof can include: a mode of further contacting a tetravalent titanium halogen compound with the reaction solution which has been obtained after the completion of the reaction, or the reaction solution after washing, which has been obtained after the above washing treatment; and a mode of further contacting the tetravalent titanium halogen compound with any one of the above reaction solutions, and then washing the resultant reaction solution. The washing after the above aftertreatment can be performed in the same way as in the aforementioned washing of the reaction solution.

The reaction product obtained after the above aftertreatment and the reaction product obtained by the washing after the aftertreatment are usually in a suspension state. Each reaction product in the suspension state is prepared into a wet state (slurry state) by leaving the suspension standing and removing a supernatant, and the solid catalyst component can be obtained. Furthermore, the solid catalyst component can be obtained by drying the solid catalyst component in the wet state by hot air drying or the like.

The present invention can provide a method for simply producing a solid catalyst component for polymerization of an olefin according to the present invention.

<Catalyst for Polymerization of Olefin and Method for Producing the Same>

Next, the catalyst for polymerization of an olefin according to the present invention will be described.

The catalyst for polymerization of an olefin according to the present invention comprises: a solid catalyst component for polymerization of an olefin according to the present invention; and one or more organoaluminum compounds selected from the compounds represented by the following general formula (II):

$$R^5_p AlQ_{3-p} \qquad (II)$$

wherein $R^5$ represents an alkyl group having 1 to 6 carbon atoms, Q represents a hydrogen atom or a halogen atom, and p represents a real number of $0 < p \leq 3$.

The details of the solid catalyst component for polymerization of an olefin, which is contained in the catalyst for polymerization of an olefin according to the present invention, are as described in the description of the solid catalyst component for polymerization of an olefin according to the present invention.

The catalyst for polymerization of an olefin according to the present invention comprises: the above specific solid catalyst component for polymerization of an olefin; and one or more organoaluminum compounds selected from the compounds represented by the general formula (II).

The catalyst for polymerization of an olefin according to the present invention includes one or more compounds selected from compounds represented by the following general formula (II), as the organoaluminum compounds:

$$R^5_p AlQ_{3-p} \qquad\qquad (II)$$

wherein $R^5$ represents an alkyl group having 1 to 6 carbon atoms, Q represents a hydrogen atom or a halogen atom, and p represents a real number of $0<p\leq3$.

In the organoaluminum compound represented by the general formula (II), $R^5$ is an alkyl group having 1 to 6 carbon atoms. Specific examples thereof can include a methyl group, an ethyl group, an n-propyl group, an isopropyl group, an n-butyl group, and an isobutyl group.

In the above organoaluminum compound represented by the general formula (II), Q represents a hydrogen atom or a halogen atom. When Q is the halogen atom, examples thereof can include a fluorine atom, a chlorine atom, a bromine atom, and an iodine atom.

Specific examples of the above organoaluminum compounds represented by the general formula (II) can include one or more compounds selected from triethylaluminum, diethylaluminum chloride, triisobutylaluminum, diethylaluminum bromide, and diethylaluminum hydride. Triethylaluminum or triisobutylaluminum is preferred.

The catalyst for polymerization of an olefin according to the present invention includes preferably 1 to 2000 mol, more preferably 50 to 1000 mol, of the organoaluminum compound per mol of a titanium atom which constitutes the solid catalyst component for polymerization of an olefin.

The catalyst for polymerization of an olefin according to the present invention can be suitably produced by a method for producing the catalyst for polymerization of an olefin according to the present invention, which will be described later.

The present inventors have conducted studies, and as a result, have found that the catalyst for polymerization of an olefin according to the present invention employs a 1,3-diether compound in place of a phthalic acid ester, and thereby can appropriately suppress a decrease in the polymerization activity with respect to olefins; limits the amount of the 1,3-diether compound constituting the solid catalyst component to a certain range and maintains the specific surface area and pore volume of the solid catalyst component to a certain range, and thereby can appropriately suppress a decrease in the above polymerization activity; and also can greatly reduce the amount of volatile organic compounds remaining in the obtained polymer of an olefin in a short period of time. As a result, the present invention has been completed.

In other words, the present invention can provide the catalyst for polymerization of an olefin, which can easily prepare the polymer of an olefin, which can greatly reduce a period of time required before a drying step ends and remarkably improve drying efficiency, when having been supplied to a polymerization reaction of olefins, in a series of steps of purging unreacted monomers and volatile substances in order to discharge polymer particles existing in the final reaction vessel, then further subjecting the reaction vessel to steam treatment, removing the reactive monomers and volatile substances, followed by drying.

Next, a method for producing the catalyst for polymerization of an olefin according to the present invention will be described.

The method for producing the polymerization catalyst of the olefin according to the present invention comprises contacting the solid catalyst component for polymerization of an olefin according to the present invention, or the solid catalyst component for polymerization of an olefin, which has been obtained in the method for producing the solid catalyst component for polymerization of an olefin according to the present invention, with one or more organoaluminum compounds selected from compounds represented by the following general formula (II):

$$R^5_p AlQ_{3-p} \qquad\qquad (II)$$

wherein $R^5$ represents an alkyl group having 1 to 6 carbon atoms, Q represents a hydrogen atom or a halogen atom, and p represents a real number of $0<p\leq3$.

In the method for producing the catalyst for polymerization of an olefin according to the present invention, the details of the solid catalyst component for polymerization of an olefin are as described in the description of the solid catalyst component for polymerization of an olefin according to the present invention.

In addition, in the method for producing the polymerization catalyst of the olefin according to the present invention, the details of the organoaluminum compounds represented by the general formula (II) are as described in the description of the catalyst for polymerization of an olefin according to the present invention.

As mentioned above, the present inventors have found that in the method for producing the catalyst for polymerization of an olefin according to the present invention, employing a 1,3-diether compound in place of a phthalic acid ester can appropriately suppress a decrease in the polymerization activity with respect to olefins, limits the amount of the 1,3-diether compound constituting the solid catalyst component to a certain range and maintains the specific surface area and pore volume of the solid catalyst component to a certain range, and thereby can appropriately suppress a decrease in the above polymerization activity, and also can greatly reduce the amount of volatile organic compounds remaining in the obtained polymer of an olefin in a short period of time; and that the method can produce such catalyst for polymerization of an olefin. As a result, the present invention has been completed.

In the method for producing the catalyst for polymerization of an olefin according to the present invention, the solid catalyst component for polymerization of an olefin and the organoaluminum compound may be contacted, in the absence of an olefin or in the presence of an olefin (in a polymerization system).

The contact between the solid catalyst component for polymerization of an olefin and the organoaluminum compound is preferably performed in an inert gas (argon, nitrogen, or the like) atmosphere or a monomer (propylene, or the like) atmosphere, in order to prevent deterioration in the solid catalyst component for polymerization of an olefin, or the catalyst for polymerization of an olefin, which is obtained.

In addition, the contact is also preferably performed in the presence of a dispersion medium such as an inert solvent in consideration of the easiness of operation. An aliphatic hydrocarbon compound such as hexane, heptane or cyclohexane, an aromatic hydrocarbon compound such as benzene, toluene, xylene or ethylbenzene, or the like is used as the inert solvent. Aliphatic hydrocarbon is more preferred. Among the inert solvents, hexane, heptane and cyclohexane are more preferred.

The temperature at which the solid catalyst component for polymerization of an olefin and the organoaluminum compound are contacted is preferably lower than 15° C., is more preferably −15° C. to 10° C., and is further preferably 0° C. to 10° C.

The contact time for which the solid catalyst component for polymerization of an olefin and the organoaluminum compound are contacted is preferably 30 minutes or shorter, is more preferably 5 seconds to 20 minutes, is further preferably 30 seconds to 15 minutes, and still further preferably 1 minute to 10 minutes.

Usually, when the organoaluminum compound which is a co-catalyst is contacted with the solid catalyst component for polymerization of an olefin, the reaction rapidly progresses, and the desorption of the 1,3-diether compound which constitutes the solid catalyst component or the activation of the solid catalyst component by the organoaluminum compound which is the co-catalyst occurs, and particularly in an inert gas atmosphere, the deactivation of the catalytic active point (titanium active point) tends to occur due to an excessive reaction.

On the other hand, by performing the contact treatment at the above contact temperature for the above contact time, the excessive reaction of the organoaluminum compound to the titanium active point in the solid catalyst component can be suppressed, and the deactivation of the catalytic active point can be effectively suppressed.

In the production method according to the present invention, the content ratio of the solid catalyst component and the organoaluminum compound which constitute the obtained catalyst for polymerization of an olefin can be arbitrarily selected in a range in which the effect of the present invention can be obtained, and is not particularly limited.

The present invention can provide a catalyst for polymerization of an olefin, which is excellent in polymerization activity per unit time when having been supplied to polymerization of the olefin, and can easily prepare a polymer of an olefin, in which a content ratio of a volatile organic compound is greatly reduced; and can provide a method for simply producing the catalyst for polymerization of an olefin.

In other words, the present invention can provide a method for simply producing the catalyst for polymerization of an olefin, which appropriately suppresses a decrease in the polymerization activity per unit time when having been supplied to a polymerization reaction of the olefin; and can easily prepare the polymer of an olefin, which can not only reduce a risk of an increase in pressure in a system and a mixing ratio of impurities in a recycle system in a post-step to reduce a process trouble and a degradation in quality of the obtained polymer because the gas is easily removed in a short period of time after the reaction, but also can have the drying efficiency improved, and the remaining volatile organic compound component greatly reduced in a short period of time.

<Method for Producing Polymer of Olefin>

Next, a method for producing a polymer of an olefin according to the present invention will be described.

The method for producing a polymer of an olefin according to the present invention includes polymerizing an olefin using the catalyst for polymerization of an olefin according to the present invention, or the catalyst for polymerization of an olefin obtained by the production method according to the present invention.

In the method for producing a polymer of an olefin according to the present invention, it is preferred that the polymerization of the olefin is propylene homopolymerization or copolymerization of propylene and an α-olefin other than propylene.

Examples of the α-olefin other than propylene include one or more compounds selected from ethylene, 1-butene, 1-pentene, 4-methyl-1-pentene, vinylcyclohexane and the like, and ethylene or 1-butene is preferred.

In the method for producing a polymer of an olefin according to the present invention, the homopolymerization of propylene may be performed, or the copolymerization of propylene and another α-olefin may be performed. In the case of copolymerizing propylene with another olefin, random copolymerization is typical which involves polymerizing propylene and a small amount of an α-olefin monomer other than propylene (such as ethylene) serving as a comonomer by one stage, as well as block copolymerization which involves homopolymerizing propylene in a first stage (first polymerization vessel), and copolymerizing propylene with another α-olefin such as ethylene in a second stage (second polymerization vessel) or more multiple stages (multistage polymerization vessels). The block copolymerization of propylene with another α-olefin is preferred.

In the method for producing a polymer of an olefin according to the present invention, the polymerization of the olefin may be performed in the presence of or also in the absence of an organic solvent.

In addition, the olefin to be polymerized can be used in any state of a gas and a liquid.

The polymerization of the olefin can be performed, for example, in a reactor such as an autoclave, by introducing the olefin in the presence of the catalyst for polymerization of an olefin according to the present invention, under a heated and pressurized state.

In the method for producing a polymer of an olefin according to the present invention, preliminary polymerization (hereinafter, appropriately referred to as pre-polymerization) may be performed prior to the polymerization of the olefin (hereinafter, appropriately referred to as main polymerization), by contacting a portion or the whole of the constituents of the catalyst for polymerization of an olefin obtained by the production method according to the present invention, with the olefin to be polymerized.

When the pre-polymerization is performed, the order of contact of the olefin and the constituents of the catalyst for polymerization of an olefin is arbitrary, which is obtained by the production method according to the present invention. Preferably, the organoaluminum compound is first charged into a pre-polymerization system which is set to an inert gas atmosphere or an olefin gas atmosphere, and subsequently, after having been brought in contact with the solid catalyst component for polymerization of an olefin, one or more olefins such as propylene are contacted therewith.

In the pre-polymerization, the same olefin as in the main polymerization, or a monomer such as styrene can be used. The pre-polymerization conditions are also the same as the polymerization conditions described above.

The pre-polymerization improves catalyst activity and facilitates further improving the stereoregularity, particle properties and the like of the polymer to be obtained.

A specific surface area of the polymer of an olefin obtained by the production method according to the present invention, is preferably 250 to 600 m²/g, is more preferably 250 to 500 m²/g, and is further preferably 250 to 450 m²/g.

The polymer of an olefin obtained by the production method according to the present invention is the polymer which is formed using the catalyst for polymerization of an olefin according to the present invention, or the catalyst for polymerization of an olefin, which has been obtained by the production method according to the present invention; and accordingly has a large specific surface area as compared with that of conventional polymers of olefins, and can greatly reduce the content ratio of the volatile organic compound.

In the present application document, the specific surface area of the polymer of an olefin means a value of a measurement sample which has been vacuum dried at 50° C. for 2 hours in advance, and then measured with the use of Automatic Surface Area Analyzer HM model-1230 manufactured by Mountech Co., Ltd., in the presence of a mixed gas of nitrogen and helium, according to the BET method (automatic measurement).

The present invention can provide a method for producing a polymer of an olefin, which can easily prepare the polymer of an olefin, in which drying efficiency is improved, and a content ratio of a remaining volatile organic compound is greatly reduced in a short period of time, under excellent polymerization activity.

In other words, the present invention can provide the catalyst for polymerization of an olefin, which can easily prepare the polymer of an olefin, which can greatly reduce a period of time required before a drying step ends and remarkably improve drying efficiency, when having been supplied to a polymerization reaction of olefins, in a series of steps of purging unreacted monomers and volatile substances in order to discharge polymer particles existing in the final reaction vessel, then further subjecting the reaction vessel to steam treatment, removing the reactive monomers and volatile substances, followed by drying.

EXAMPLES

Next, the present invention will be described further specifically with reference to Examples. However, these examples are given merely for illustration and do not limit the present invention.

Example 1

<Preparation of Solid Catalyst Component>

The inside of a round bottom flask having a volume of 500 ml equipped with a stirrer was sufficiently purged with nitrogen gas (inert gas), and was charged with 20 g of diethoxy magnesium (magnesium compound) (average particle size D50 of 20.0 μm, and specific surface area of 20.4 m²/g) and 60 ml of toluene (inactive organic solvent); and a diethoxy magnesium-containing liquid in a suspended state was obtained.

Subsequently, the diethoxy magnesium-containing liquid was added to a mixed solution of 50 ml of toluene and 40 ml of titanium tetrachloride (tetravalent titanium halogen compound), which was previously charged in a round bottom flask having a volume of 500 ml equipped with a stirrer and sufficiently purged with nitrogen gas; and a suspension was prepared.

Subsequently, the obtained suspension was reacted at −6° C. for 1 hour, and then 10.0 mmol of 2-isopropyl-2-isopentyl-1,3-dimethoxypropane (1,3-diether compound) and 14.0 mmol of (2-ethoxyethyl)ethyl carbonate (other internal electron-donating compound) were added thereto. The mixture was further heated to 100° C., and then, was subjected to reaction treatment for 2 hours while being stirred.

After completion of the reaction, the supernatant was extracted and washed four times with 150 ml of toluene at 90° C. To the obtained reaction product, 20 ml of titanium tetrachloride and 100 ml of toluene were added. The mixture was heated to 100° C. and reacted for 15 minutes four times, and then, the product was washed six times with 150 ml of n-heptane (inactive organic solvent) at 40° C.; and a solid catalyst component was obtained.

After the solid-liquid separation, the content of titanium atoms in the obtained solid catalyst component was measured by the aforementioned method, and as a result, was 2.3% by mass. In addition, the content of magnesium atoms in the obtained solid catalyst component was measured by the aforementioned method, and as a result, was 19.9% by mass. The content of halogen atoms in the obtained solid catalyst component was 65.0% by mass according to measurement of the solid catalyst component by the aforementioned method.

In addition, an average particle size, a specific surface area and a pore volume of the obtained solid catalyst component described above were measured by the aforementioned methods. The results are shown in Table 1.

<Formation of Catalyst for Polymerization (Preliminary Contact)>

An autoclave having an internal volume of 2.0 liter with a stirrer thoroughly purged with nitrogen gas was charged with 7 ml of n-heptane (inactive solvent), 1.32 mmol of triethylaluminium (organoaluminum compound) and 0.00165 mmol (in terms of titanium atom) of the above solid catalyst component, and the internal temperature of the autoclave was maintained at 10° C. for 3 minutes under a nitrogen atmosphere; and a catalyst for polymerization was formed.

<Polymerization of Olefin>

Subsequently, the above autoclave having the catalyst for polymerization, which was formed as described above, was charged with 1.5 liters of hydrogen gas and 1.4 liters of liquefied propylene. Then, the autoclave was heated to 20° C., and pre-polymerization was performed at an internal temperature of 20° C. in the autoclave for 5 minutes. Then, the autoclave was heated to 70° C., and a polymerization reaction was performed at an internal temperature of 70° C. in the autoclave for 1 hour.

In addition, the polymerization activity in the polymerization reaction was determined according to the following method, and a recovered amount of the volatile organic compound and a release rate of the volatile organic compound of the obtained polymer were calculated according to the following methods. The results are shown in Table 1.

<Polymerization Activity>

The polymerization activity (kg-PP/g-cat), which represents an amount (F) kg of a polymer produced per hour of polymerization time per 1 g of the solid catalyst component, was calculated according to the following expression.

Polymerization activity (kg-PP/g-cat)=Produced polymer (F) kg/solid catalyst component g/1 hour <Recovered Amount of Volatile Organic Compounds>

After 200 g of the polymer obtained by the above reaction was collected and air-dried at room temperature for 12 hours; and the resultant polymer was inserted into an autoclave having an inner volume of 2 liters and dried under reduced pressure at 70° C. for 2 hours, by a vacuum pump (model No. G-100D, manufactured by Ulvac Inc., ultimate vacuum degree: $10^{-3}$ Torr).

Subsequently, an operation of pressurizing the inside of the autoclave to 0.5 MPa with propylene gas and reducing the pressure to 0.1 MPa was repeated three times in total, and then the inside of the autoclave was pressurized to 0.8 MPa with propylene gas, heated to 70° C., and held for 1 hour. After that, the gas component in the autoclave was released to the outside of the system, the pressure was reduced to atmospheric pressure for three minutes in each time, and then the whole amount of the polymer was recovered in the flask within 5 minutes, and the mass P (g) of the flask was measured that contained the polymer in a state in which the volatile organic compound component remained. The above flask was dried with the use of a rotary evaporator while being heated to 70° C., and the flask mass S (g) was measured every 3 hours. After it was confirmed that the flask mass reached a constant amount (after 12 hours elapsed), the drying was stopped.

Note that the above constant amount means a state in which the recovery of the volatile organic compound is finished (recovered amount $R''$ for n hours=0 [ppm by mass]).

At this time, the recovered amount of the volatile organic compound (content of volatile organic compound per 1 g of polymer) in each time was calculated according to the following expression.

Recovered amount of volatile organic compound
(ppm by mass)=[{$P$ (g)–$S$ (g)}/200 (g)]×
1000000

<Release Rate of Volatile Organic Compound>

Drying by the above rotary evaporator was performed every 3 hours until the recovered amount reached the constant amount. The recovered amounts of the volatile organic compound measured at this time were a recovered amount $R^1$ (ppm by mass) after 3 hours from the start of drying; a recovered amount $R^2$ (ppm by mass) at the time when the drying by the rotary evaporator was performed for 12 hours; and a recovered amount $R^3$ (ppm by mass) at the time when the drying by the rotary evaporator was performed until the recovered amount reached the constant amount. The results are shown in Table 1.

In addition, Table 1 shows the required time (hours) up to the constant amount at this time, a ratio (% by mass) of the recovered amounts of the volatile organic compound calculated by the following expression, and the recovered amounts of the volatile organic compound from the start of drying to the constant amount after 3 hours have elapsed.

Drying efficiency (% by mass) of volatile organic
compound=(recovered amount $R^1$ of volatile
organic compound after 3 hours from the start
of drying/recovered amount $R^3$ of volatile
organic compound at the time of drying treat-
ment until recovered amount reaches constant
amount)×100

Recovered amount (ppm by mass) of volatile
organic compound up to reaching the constant
amount after 3 hours have elapsed from the
start of drying=(recovered amount $R^3$ of volatile
organic compound at the time of drying treat-
ment until recovered amount reaches constant
amount)–(recovered amount $R^1$ of volatile
organic compound after 3 hours from the start
of drying)

Example 2

A solid catalyst component was prepared in the same way as in Example 1, except that 8.5 mmol of 2-isopropyl-2- isopentyl-1,3-dimethoxypropane and 12.5 mmol of (2-ethoxyethyl) ethyl carbonate were added in <Preparation of solid catalyst component> of Example 1, in place of the addition of 10.0 mmol of 2-isopropyl-2-isopentyl-1,3-dime-thoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were determined in the same method as in Example 1. The results are shown in Table 1.

Example 3

A solid catalyst component was prepared in the same way as in Example 1, except that only 15.0 mmol of 2-isopropyl-2-isopentyl-1,3-dimethoxypropane was added in <Preparation of solid catalyst component> of Example 1, in place of the addition of 10.0 mmol of 2-isopropyl-2-isopentyl-1,3-dimethoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were determined in the same method as in Example 1. The results are shown in Table 1.

Example 4

A solid catalyst component was prepared in the same way as in Example 1, except that 10.0 mmol of 2-isopropyl 2-isopentyl-1,3-dimethoxypropane and 10.0 mmol of diethyl benzylidenemalonate were added in <Preparation of solid catalyst component> of Example 1, in place of the addition of 10.0 mmol of 2-isopropyl-2-isopentyl-1,3-dime-thoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the drying efficiency of the volatile organic compound, the required time up to the constant amount, the ratio of the recovered amount of the volatile organic compound, and the recovered amount of the volatile organic compound up to reaching the constant amount after 3 hours elapsed from the start of drying were determined in the same method as in Example 1. The results are shown in Table 1.

Example 5

A solid catalyst component was prepared in the same way as in Example 1, except that 10.0 mmol of 2-isopropyl-2-isopentyl-1,3-dimethoxypropane and 10.0 mmol of dimethyl diisobutylmalonate were added in <Preparation of solid catalyst component> of Example 1, in place of the addition of 10.0 mmol of 2-isopropyl-2-isopentyl-1,3-dimethoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were determined in the same method as in Example 1. The results are shown in Table 1.

Example 6

A solid catalyst component was prepared in the same way as in Example 1, except that 10.0 mmol of 2-isopropyl-2-isopentyl 1,3-dimethoxypropane and 10.0 mmol of diethyl 2,3-diisopropylsuccinate were added in <Preparation of solid catalyst component> of Example 1, in place of the addition of 10.0 mmol of 2-isopropyl-2-isopentyl-1,3-dimethoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were determined in the same method as in Example 1. The results are shown in Table 1.

Comparative Example 1

A solid catalyst component was prepared in the same way as in Example 1, except that 22.4 mmol of only 2-isopropyl-2-isopentyl-1,3-dimethoxypropane was added in <Preparation of solid catalyst component> of Example 1, in place of the addition of 10.0 mmol of 2-isopropyl-2-isopentyl-1,3-dimethoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were determined in the same method as in Example 1. The results are shown in Table 1.

Comparative Example 2

A solid catalyst component was prepared in the same way as in Example 1, except that 20 g of diethoxy magnesium was charged which had an average particle size D50 (particle size of 50% in integrated particle size in volume integrated particle size distribution) of 38.9 μm and a specific surface area of 18.8 m=/g, in <Preparation of solid catalyst component> of Example 1, in place of 20 g of diethoxy magnesium which had an average particle size D50 (particle size of 50% in integrated particle size in volume integrated particle size distribution) of 20.0 μm and a specific surface area of 20.4 $m^2$/g, and 24.0 mmol of only 2-isopropyl-2-isopentyl-1,3-dimethoxypropane was added, in place of the addition of 10.0 mmol of 2-isopropyl-2-isopentyl-1,3-dimethoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were determined in the same method as in Example 1. The results are shown in Table 1.

Comparative Example 3

A solid catalyst component was prepared in the same way as in Example 1, except that 7.2 mmol of 2-isopropyl-2-isopentyl-1,3-dimethoxypropane and 12.5 mmol of (2-ethoxyethyl) ethyl carbonate were added in <Preparation of solid catalyst component> of Example 1, in place of the addition of 10.0 mmol of 2-isopropyl-2-isopentyl-1,3-dimethoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were determined in the same method as in Example 1. The results are shown in Table 1.

Comparative Example 4

A solid catalyst component was prepared in the same way as in Example 1, except that 3.6 mmol of 2-isopropyl-2-isopentyl-1,3-dimethoxypropane and 15.0 mmol of (2-ethoxyethyl) ethyl carbonate were added in <Preparation of solid catalyst component> of Example 1, in place of the addition of 10.0 mmol of 2-isopropyl-2-isopentyl-1,3-dimethoxypropane and 14.0 mmol of (2-ethoxyethyl) ethyl carbonate; and a polymerization catalyst was formed (preliminary contact) and an olefin was polymerized.

The average particle size, the specific surface area and the pore volume of the obtained solid catalyst component were measured in the same method as in Example 1.

In addition, the polymerization activity at the time of the polymerization reaction was determined in the same method as in Example 1, and on the obtained polymer, the recovered amount of the volatile organic compound, the required time up to the constant amount, the drying efficiency of the volatile organic compound, and the recovered amount of the volatile organic compound up to reaching the constant amount after 3 hours elapsed from the start of drying were calculated in the same method as in Example 1. The results are shown in Table 1.

TABLE 1

| | | Example 1 | Example 2 | Example 3 | Example 4 | Example 5 | Example 6 |
|---|---|---|---|---|---|---|---|
| Properties of solid catalyst component | Content ratio of 1,3-diether compound (% by mass) | 5.41 | 4.52 | 10.55 | 5.22 | 5.10 | 5.57 |
| | Average particle size (μm) | 17.3 | 17.7 | 17.9 | 17.5 | 17.4 | 17.9 |
| | Specific surface area (m$^2$/g) | 378 | 393 | 401 | 296 | 325 | 271 |
| | Pore volume (m$^3$/g) | 0.450 | 0.461 | 0.467 | 0.409 | 0.421 | 0.387 |
| Polymerization activity (kg-PP/g-cat) | | 72.5 | 69.2 | 75.1 | 68.7 | 66.9 | 65.4 |
| Recovered amount of volatile organic compounds (ppm by mass) | After 3 hours (R$^1$) | 622 | 647 | 680 | 588 | 639 | 569 |
| | After 12 hours (R$^2$) | 1071 | 1001 | 958 | 1033 | 986 | 1011 |
| | Up to constant amount (R$^3$) | 1071 | 1001 | 958 | 1033 | 986 | 1011 |
| Time required up to reaching constant amount (drying time) | | 12 | 12 | 12 | 12 | 12 | 12 |
| Drying efficiency of volatile organic compound {(R$^1$/R$^3$) × 100} (% by mass) | | 58.1 | 64.6 | 71.0 | 56.9 | 64.8 | 56.3 |
| Recovered amount of volatile organic compounds up to reaching constant amount after 3 hours elapsed from the start of drying (R$^3$ − R$^1$) (ppm by mass) | | 449 | 354 | 278 | 455 | 347 | 442 |

| | | Comparative Example 1 | Comparative Example 2 | Comparative Example 3 | Comparative Example 4 |
|---|---|---|---|---|---|
| Properties of solid catalyst component | Content ratio of 1,3-diether compound (% by mass) | 17.50 | 18.30 | 2.44 | 4.13 |
| | Average particle size (μm) | 18.0 | 37.8 | 17.8 | 17.6 |
| | Specific surface area (m$^2$/g) | 222 | 60 | 416 | 198 |
| | Pore volume (m$^3$/g) | 0.230 | 0.079 | 0.390 | 0.200 |
| Polymerization activity (kg-PP/g-cat) | | 85.8 | 89.0 | 58.1 | 45.7 |
| Recovered amount of volatile organic compounds (ppm by mass) | After 3 hours (R$^1$) | 494 | 279 | 553 | 368 |
| | After 12 hours (R$^2$) | 1059 | 719 | 1206 | 997 |
| | Up to constant amount (R$^3$) | 1174 | 857 | 1206 | 1033 |
| Time required up to reaching constant amount (drying time) | | 15 | 15 | 12 | 15 |
| Drying efficiency of volatile organic compound {(R$^1$/R$^3$) × 100} (% by mass) | | 42.1 | 32.6 | 45.9 | 35.6 |
| Recovered amount of volatile organic compounds up to reaching constant amount after 3 hours elapsed from the start of drying (R$^3$ − R$^1$) (ppm by mass) | | 680 | 578 | 653 | 665 |

From Table 1, it is understood that in Examples 1 to 6, a specific solid catalyst component containing a specific ratio of a 1,3-diether compound is used, in place of a phthalic acid ester, and as a result, the polymerization activity per unit time is excellent. In addition, it is understood that in Examples 1 to 6, in the obtained polymers of olefins, the drying efficiency $\{(R^1/R^3)\times100\}$ of the volatile organic compound is high, and the recovered amount $(R^3-R^1)$ of the volatile organic compound up to reaching the constant amount after 3 hours has elapsed from the start of drying is small; and accordingly that the catalysts for polymerization can easily provide polymers of olefins, which have the drying efficiency improved, easily release the volatile organic compound in a short period of time, and have the content ratio thereof greatly reduced. In other words, it is understood that, in Example 1 to Example 6, the polymers of olefins which can greatly release the volatile organic compound in a short period of time, while appropriately suppressing the decrease in the polymerization activity per unit time, can be prepared.

On the other hand, it is understood from Table 1 that in Comparative Examples 1 to 4, the above specific solid catalyst component is not used; and accordingly, that the polymerization activity is inferior to those of the above Examples (Comparative Example 3 and Comparative Example 4). In addition, it is understood that, in the obtained polymers of olefins, the drying efficiency $\{(R^1/R^3)\times100\}$ of the volatile organic compound is low, and the recovered amount $(R^3-R^1)$ of the volatile organic compound up to reaching the constant amount after 3 hours has elapsed from the start of drying is large; and accordingly that the volatile organic compound resists being released in a short period of time, and the content ratio of the volatile organic compound resists being reduced (Comparative Examples 1 to 4). In other words, it is understood that the catalysts for polymerization in Comparative Examples 1 to 4 cannot achieve both the suppression of the decrease in the polymerization activity per unit time, and the release of the volatile organic compound in a short period of time in the obtained polymers of olefins.

In general, a trouble tends to easily occur not only in the case where the amount of volatile organic compound remaining in the polymer of olefin is large, but also in the case where the volatile organic compound remaining in the polymer of olefin resists being degassed and a long period of time is required for the release thereof. However, for example, it is understood that as is apparent from the comparison between Example 4 and Comparative Example 4 shown in Table 1, even though the amount of a volatile organic compound (recovered amount $R^3$ of volatile organic compound up to constant amount) contained in the obtained polymer of an olefin may be the same, the catalyst for polymerization in Example 4 employs the specific solid catalyst component according to the present invention, and accordingly can easily provide the polymer of an olefin, in which the drying efficiency is improved, the volatile organic compound is easily released in a short period of time, and thereby the content ratio thereof is greatly reduced.

INDUSTRIAL APPLICABILITY

The present invention can provide: a solid catalyst component for polymerization of an olefin, which can appropriately suppress a decrease in polymerization activity per unit time when having been supplied to the polymerization of the olefin, even without using a phthalic acid ester, and can easily prepare a polymer of an olefin, in which drying efficiency is improved, and a content ratio of a remaining volatile organic compound is greatly reduced in a short period of time; and a method for producing the same; a catalyst for polymerization of an olefin, which contains such a solid catalyst component; and a method for producing the same; and a method for producing a polymer of an olefin.

The invention claimed is:

1. A method for producing a solid catalyst component for polymerization of an olefin, the solid catalyst component for polymerization of an olefin comprising magnesium, titanium, halogen and a 1,3-diether compound, wherein the method for producing the solid catalyst component does not include an alcohol, wherein a ratio of the 1,3-diether compound contained in the solid catalyst component for polymerization of an olefin is 2.50 to 15.00% by mass, and a specific surface area of the solid catalyst component for polymerization of an olefin is 250 $m^2$/g or larger, the method comprising:

contacting a magnesium compound having a specific surface area of 5 $m^2$/g to 40 $m^2$/g, a tetravalent titanium halogen compound, and a 1,3-diether compound with each other.

* * * * *